US012504547B2

(12) United States Patent
Gmelch et al.

(10) Patent No.: US 12,504,547 B2
(45) Date of Patent: Dec. 23, 2025

(54) SENSOR AND SENSOR DEVICE FOR DETERMINING A RADIATION DOSE, READ-OUT DEVICE FOR READING OUT A SENSOR, AND METHOD FOR DETERMINING A RADIATION DOSE

(71) Applicant: PRUUVE GmbH, Dresden (DE)

(72) Inventors: Max Gmelch, Dresden (DE); Tim Achenbach, Dresden (DE); Paul-Anton Will, Dresden (DE); Sebastian Reineke, Dresden (DE)

(73) Assignee: PRUUVE GmbH, Dresden (DE)

( * ) Notice: Subject to any disclaimer, the term of this patent is extended or adjusted under 35 U.S.C. 154(b) by 154 days.

(21) Appl. No.: 18/264,460

(22) PCT Filed: Apr. 13, 2022

(86) PCT No.: PCT/EP2022/059880
§ 371 (c)(1),
(2) Date: Oct. 13, 2023

(87) PCT Pub. No.: WO2022/223397
PCT Pub. Date: Oct. 27, 2022

(65) Prior Publication Data
US 2024/0045082 A1 Feb. 8, 2024

(30) Foreign Application Priority Data
Apr. 19, 2021 (DE) .................... 10 2021 109 797.5

(51) Int. Cl.
*G01T 1/105* (2006.01)
(52) U.S. Cl.
CPC .................. *G01T 1/105* (2013.01)

(58) Field of Classification Search
CPC ......... G01T 1/105; G01T 1/10; G01T 1/2012; G01T 1/2014; F21K 2/08; G01J 1/58; G06K 19/0614
See application file for complete search history.

(56) References Cited

U.S. PATENT DOCUMENTS 4,507,562 A   3/1985 Gasiot et al.
9,086,489 B2 * 7/2015 Patel .................... G01T 1/04

FOREIGN PATENT DOCUMENTS

WO    2020/039090 A2    2/2020

OTHER PUBLICATIONS

Hirata et al. "Efficient Persistent Room Temperature Phosphorescence in Organic Amorphous Materials under Ambient Conditions", XP-001585135, Adv. Funct. Moter. 2013, 23, 3336-3397.

(Continued)

*Primary Examiner* — David P Porta
*Assistant Examiner* — Fani Polyzos Boosalis
(74) *Attorney, Agent, or Firm* — Zhigang Ma (57) ABSTRACT

A sensor and a sensing device for determining a radiation dose, a readout device for reading out a sensor, and a method for determining a radiation dose, the sensor (110) comprising: an organic material, the organic material having a radiation dose-dependent light emission characteristic such that a characteristic light emission is generated from the organic material once the organic material has accumulated a radiation dose greater than a threshold radiation dose characteristic (172), the sensor (110) being further configured such that a difference of the threshold radiation dose characteristic (172) and a radiation dose accumulated in the material represents a to-be-determined radiation dose.

15 Claims, 5 Drawing Sheets

(56) References Cited

OTHER PUBLICATIONS

Botter-Jensen et al. "Review of optically stimulated luminescence (OSL) instrumental developments for retrospective dosimetry", Radiation Measurements 45 (2010) 253-257.
International Search Report issued in PCT/EP2022/059880, mailed Jun. 29, 2022.

\* cited by examiner

SENSOR AND SENSOR DEVICE FOR DETERMINING A RADIATION DOSE, READ-OUT DEVICE FOR READING OUT A SENSOR, AND METHOD FOR DETERMINING A RADIATION DOSE

Various embodiments relate to a sensor and a sensing device for determining a radiation dose, a readout device for reading a sensor, and a method for determining from a radiation dose.

In general, measuring a dose of electromagnetic radiation of various wavelengths may be important in industry and research. Modern technologies, for example in medicine, environmental and life sciences, disinfection and production, may use ultraviolet (UV) radiation in addition to infrared radiation and visible light. The measurement technology that may be used to determine radiometric parameters may form a basis for numerous applications of modern technologies. Accurate quantification may enable documentation and optimization of technical processes. For example, small and electronics-free measuring strips may be used to determine radiometric parameters. The measurement strips may be advantageous over other measurement systems due to special spatial challenges, for example, limitations due to insufficient space and/or complicated three-dimensional structures. The measuring strips may be used in an uncomplicated manner in a wide variety of geometries and installations, for example to measure various parameters of electromagnetic radiation spatially resolved and quickly.

For example, the sensing strips may comprise a sensor surface with a phosphorescent material. If, for example, the introduced radiation exceeds a threshold value at a certain point on the sensor surface, the phosphorescence may be activated. The threshold value may be set via the material parameters of the sensor. This enables threshold measurements, for example, since the phosphorescence of an irradiated region is activated only after irradiation with a threshold value, also referred to as a minimum value. The measurement of absolute dose values may be made possible, for example, by creating a gradient of the threshold value in the sensor, or by covering the sensor with a gradual neutral density filter. A digital readout of the determined dose value is then possible, for example, by means of a sensor array or a movable strip detector arrangement. For example, one-dimensional or multi-dimensional measuring strips may also be read out in this way.

The measuring strips may comprise a radiation-sensitive dye. The dye may reduce the transmission of the strip with increasing irradiation. The measuring strip may thus gradually change its color under UV irradiation. A UV radiation measurement may thus be realized directly on a relevant object, for example. By means of an additional measuring device, for example, the color change or a color difference may be determined. Thus, for example, a quantitative determination of the UV irradiation or an irradiation dose may be determined.

The use or manufacture of conventional measuring strips, e.g. those described above, may be inefficient or problematic. On the one hand, an adjustment (or production) of the gradient of the threshold value within the measuring strip may only be implemented with a lot of effort. For example, determining only a discrete dose value may also be insufficient. On the other hand, a complex reading device may be necessary to read out the measured value. For example, the reading device should be able to resolve the measurement strip in at least one dimensional. In addition, illumination may be required to read out the measuring strip, which may lead to a misrepresentation of a measured value.

For concepts and systems that use color variation to determine radiation parameters, the determination of absolute irradiance values may be difficult. For example, the determination may be affected by weak color contrasts, by environmental influences, by storage conditions, and/or by interfering radiation. For example, the measuring strips of these concepts and systems may not be reusable.

According to various aspects, there is provided a sensing device or method that may enable a determination of an absolute value of a radiance, and/or an irradiance, and/or a specific irradiance, and/or a radiant energy, and/or an irradiance using a readout device.

According to various aspects, a measuring strip is provided that may be reused.

According to various aspects, there is provided a measurement strip that may have increased robustness to environmental influences, and/or interfering radiation, and/or storage conditions.

According to various aspects, there is provided a readout method, or a readout device, that may have a simple and robust readout technique.

According to various aspects, there is provided a sensor for determining a radiation dose, the sensor comprising: an organic material, the organic material having a light emission characteristic that is radiation dose dependent such that a characteristic light emission is produced by the organic material once the organic material has accumulated a radiation dose that is greater than a threshold radiation dose characteristic, the sensor being further configured such that a difference of the threshold radiation dose characteristic and a radiation dose accumulated in the material represents a radiation dose to be determined.

According to various aspects, there is provided a sensing device for determining a radiation dose, the sensing device comprising, a first sensor according to any one of claims 1 to 5, and a second sensor according to any one of claims 1 to 5.

According to various aspects, there is provided a readout device for reading out a sensing device according to any one of claims 1 to 6, wherein the organic material of the sensor comprises a measurement dose, the readout device comprising: an auxiliary radiation source for irradiating the sensor with an auxiliary dose, the auxiliary dose representing the radiation dose accumulated on the sensor, an output device for outputting the auxiliary dose.

According to various aspects, there is provided a method for determining a measurement dose accumulated in an organic material of a sensor according to any one of claims 1 to 6, the method comprising applying an additional dose until the organic material of the sensor produces the characteristic light emission, and outputting the additional dose representing the accumulated radiation dose of the sensor.

Thus, illustratively in various embodiments, a method is provided that allows to determine absolute radiometric values of incident radiation. For example, an absolute value of a radiant intensity, an irradiance, a specific irradiance, a radiant energy, an irradiance, and/or the measurement dose may be determined. For example, the radiometric values may be determined using a determined radiation dose.

In various embodiments, a method and a sensor are provided that allow to determine a radiation dose (a so-called measured dose) that is below a characteristic threshold dose. Illustratively, a method and a sensor are thus provided that allow the measurement of a dose range. For example, the dose range may be the entire range below the characteristic threshold dose. For example, within the dose range, the measured dose may be determined as a continuous quantity. Illustratively, with respect to a predefined measurement area, a higher measurement resolution may be achieved, since the measurement described herein is continuous in the range below the threshold dose; conventional measurement strips, on the other hand, usually provide only a very coarse discrete measurement division. Thus, there is no need to generate a gradient or to provide a plurality of sensors to determine an unknown dose. This may also simplify the manufacture of such sensors.

Furthermore, the measurement dose may be determined, for example, using a greatly simplified readout technique compared to conventional systems. In contrast to complex readout systems that may be required in conventional methods (e.g., in the form of one- or multi-dimensional sensor arrays for reading out the measuring strips), a single photodiode, e.g., a point-shaped photodiode, may be used as a readout detector.

Further, in various embodiments, a simple and robust readout method is provided in which the additional dose may be applied using, for example, a simple light-emitting diode (LED, e.g., a UV LED).

Embodiments are shown in the figures and are explained in more detail below.

Shown is

FIG. 3A-4B, measurement setups before and after reaching a characteristic threshold radiation dose;

In the following detailed description, reference is made to the accompanying drawings which form part thereof and in which are shown, for illustrative purposes, specific embodiments in which the invention may be practiced. Since components of embodiments may be positioned in a number of different orientations, the directional terminology is for illustrative purposes and is not limiting in any way. It is understood that other embodiments may be used and structural or logical changes may be made without departing from the scope of protection of the present invention. It is understood that the features of the various exemplary embodiments described herein may be combined, unless otherwise specifically indicated. Therefore, the following description is not to be construed in a limiting sense, and the scope of protection of the present invention is defined by the appended claims.

In the following, different properties of components may be compared with each other. If the same properties of different components are to be compared with each other, this should generally be understood to mean that this property is determined for the components in each case under the same measurement conditions (for example, same temperature, same pressure, same humidity, same ambient lighting, etc.).

According to various aspects, a sensing device for detecting electromagnetic radiation is provided. According to various aspects, sensors may be configured to interact with electromagnetic radiation, such as to detect the electromagnetic radiation. According to various aspects, materials described herein may comprise light emission. Light emission may be understood herein to mean the emission of electromagnetic radiation. A characteristic light emission is a light emission specific to a material, which is explained in more detail with reference to FIG. 1A.

According to various aspects, the electromagnetic radiation described herein, which may be briefly referred to as radiation, may comprise various wavelength ranges. For example, the electromagnetic radiation may comprise or be ionizing radiation (e.g., X-rays or gamma radiation), and/or ultraviolet radiation (UV radiation), and/or extreme ultraviolet radiation (EUV), and/or visible light, and/or infrared radiation (IR radiation). For example, the ionizing radiation may comprise one or more wavelengths in a range from 10 pm to 10 nm. For example, the ionizing radiation may comprise one or more energies in a range from 100 eV to 100 keV. For example, the UV radiation may comprise one or more of the following ranges in whole or in part: EUV radiation from 10 nm to 100 nm, UVC radiation from 100 nm to 280 nm, and/or UVB radiation from 280 nm to 315 nm, and/or UVA-II radiation from 315 nm to 340 nm, and/or UVA-I radiation from 340 nm to 400 nm. For example, the visible light may comprise all or a portion of one or more the following ranges: violet from 380 nm to 420 nm, and/or blue from 420 nm to 490 nm, and/or green from 490 nm to 575 nm, and/or yellow from 575 nm to 585 nm, and/or orange from 585 nm to 650 nm, and/or red from 650 nm to 780 nm. For example, IR radiation may comprise all or a portion of one or more the following ranges: IR-A radiation from 780 nm to 1400 nm, and/or IR-B radiation from 1400 nm to 3000 nm, and/or IR-C radiation from 3000 nm to 1 mm.

It is understood that the electromagnetic radiation may comprise one or more wavelengths. The respective wavelengths may be selected from one or more of the plurality of ranges described above. A selection of one or more wavelengths may be referred to as a light spectrum, wavelength spectrum, or a spectrum for short. For example, a light source may comprise an emission spectrum, (a so-called characteristic emission spectrum), meaning that the light source may emit radiation at one or more particular or known wavelengths. For example, a sensor may comprise a detection spectrum, (a so-called characteristic detection spectrum), i.e., that the sensor may detect radiation with one or more particular wavelengths better than a radiation with one or more particular other wavelengths. For example, a detector may comprise a characteristic detection spectrum.

According to various aspects, the electromagnetic radiation may comprise a radiation intensity, which may also be referred to herein as intensity for short. An area power density of the electromagnetic radiation may be referred to as an intensity. For example, a first intensity of a radiation may be less than a second intensity of the same radiation (i.e., having the same spectrum). For example, for visible light, the second intensity may produce a brighter visual impression than the first intensity. For example, the second intensity may deposit more energy in a medium than the first intensity (e.g., for the same time and at the same wavelength).

According to various aspects, there is provided a sensing device that may be used to measure a radiation dose of electromagnetic radiation. According to various aspects, the sensing device may comprise a sensor. According to various aspects, the sensor may comprise an organic material. For example, the organic material may comprise PhenDPA (suitable, e.g., for radiation in a wavelength range of 250 nm to 420 nm), PhenTPA (suitable, e.g., for radiation in a wavelength range of 250 nm to 420 nm), Tetra-N-phenyl-benzidine (suitable, e.g., for radiation in a wavelength range of 250 nm to 390 nm), N,N'-di(1-naphthyl)-N,N'-diphenyl-(1,1'-biphenyl)-4,4'-diamine (suitable, e.g., for radiation in a wavelength range of 250 nm to 400 nm), thianthrenes (suitable, e.g., for radiation in a wavelength range of 250 nm to 350 nm), benzophenone-thianthrenes (suitable, e.g., for radiation in a wavelength range of 220 nm to 400 nm), bromo-benzophenone-thianthrenes (suitable, e.g., for radiation in a wavelength range of 220 nm to 400 nm), benzophenone-2-thianthrenes (suitable, e.g., for ionizing radiation (e.g., X-rays or gamma radiation), and/or suitable, e.g., for radiation in a wavelength range of 200 nm to 400 nm), diphenylsulfone-thianthrenes, diphenylsulfone-2-thianthrenes, bromodiphenylsulfone-thianthrenes, platinum octaethylporphyrin (suitable, e.g., for radiation in a wavelength range of 300 nm to 550 nm), 2-hydroxycarbazoles (suitable, e.g., for radiation in a wavelength range from 250 nm to 300 nm), difluoroborone-9-hydroxyphenalenone (suitable e.g., for radiation in a wavelength range from 300 nm to 470 nm), and/or difluoroborone-6-hydroxybenz[de]anthracene-7-on (suitable, e.g., for radiation in a wavelength range from 300 to 470 nm).

For example, the organic material may be selected from the group consisting of the following compounds:

For example, R1, R2, and R3 may be identical to or different from each other. For example, R1 may be a substituted or unsubstituted aryl or a substituted or unsubstituted heteroaryl or a substituted or unsubstituted alkyl or a substituted or unsubstituted heteroalkyl or hydrogen. For example, R2 may be a substituted or unsubstituted aryl or a substituted or unsubstituted heteroaryl or a substituted or unsubstituted alkyl or a substituted or unsubstituted heteroalkyl or hydrogen. For example, R3 may be a substituted or unsubstituted alkyl or a substituted or unsubstituted heteroalkyl or hydrogen or a nitro group. For example, R3 may be selected from the group consisting of H, OR4 or NO2. For example, R4 may be H or a (C1-C8) alkyl. For example, R5 may be either H, a halogen, or a thianthrene. For example, X may be P or N. For example, Y1, Y2, Y3 and Y4 may each be independently selected from C or N, where either two or four of Y1, Y2, Y3 and Y4 may be N. Z1 and Z2 may be independently selected from each other. Z1 may be either an enol or sulfoxide. Z2 may be absent or a heteroatom or selected from the group consisting of —NR4. Z3 may be selected from the group consisting of —NR4 or —CR4R4.

The organic material may be sensitive to one or more ranges of electromagnetic radiation. The organic material may interact more strongly with one or more wavelengths than with one or more other wavelengths. For example, an organic material may comprise a characteristic detection spectrum. The one or more ranges may be contiguous or separated. The one or more ranges may comprise one or more wavelengths selected from the UV radiation range, and/or the visible light range, and/or the IR radiation range.

The organic material may be configured to interact with the electromagnetic radiation. The interaction may introduce or deposit a radiation dose in the organic material. The radiation dose may be normalized to an irradiated area. For example, an irradiated area may be an area that has been irradiated with more than 10% of a maximum dose, e.g., with more than 20%, 30%, 40%, 50%, 60%, 70%, 80%, 90%, 95%, 97.5%, or with more than 99% of the maximum dose. The radiation dose may also be referred to as dose for short in the following. The dose may be accumulated by the organic material. For example, the accumulated dose may be stored in the organic material for a longer period of time, such as more than 1 hour, more than 2 hours, more than 12 hours, or more than 1 day.

According to various aspects, the organic material may be configured to luminesce, such as phosphoresce. The organic material may comprise a threshold dose, which may also be referred to as a characteristic threshold dose. For example, the organic material may comprise a characteristic light emission when the accumulated dose is equal to the characteristic threshold dose. The organic material may comprise a radiation-dependent, e.g., radiation dose-dependent, light emission characteristic. For example, a characteristic light emission may be produced by the organic material once the organic material has accumulated a dose equal to the characteristic threshold dose. A characteristic light emission may be an increase in light emission, for example, from an intensity of the emitted electromagnetic radiation. For brevity, the characteristic threshold dose of an organic material of a sensor may also be referred to hereinafter as the characteristic threshold dose of the sensing device or sensor.

Figure 1A:
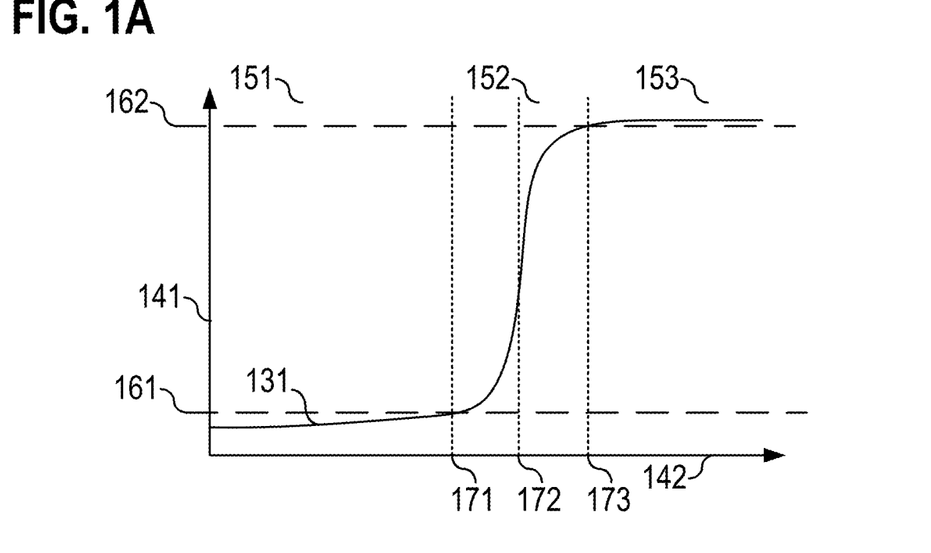
FIG. 1A, a phosphorescence dose diagram showing a radiation dose-dependent light emission characteristic of an organic material.

FIG. 1A shows a phosphorescence dose diagram. An accumulated dose of an organic material from a sensor 110 is shown on a horizontal axis 142. An intensity of a light emission is shown on a vertical axis 141. The intensity may be related to a particular wavelength. The intensity may be related to a plurality of wavelengths, such as an average of the plurality of wavelengths or a sum of intensities of the plurality of wavelengths. A variation of an intensity 131 of the light emission as a function of an accumulated dose may also be referred to as a light emission characteristic. By increasing the accumulated dose of the organic material, the light emission of the organic material may be increased. For example, the light emission may be phosphorescence. For example, the light emission may be a characteristic light emission.

In a first dose range 151, the intensity 131 of the light emission may be less than or equal to a first intensity 161. In the first dose range, a dose accumulated by the organic material may be less than a lower threshold dose 171. In a third dose range 153, the intensity 131 of the light emission may be equal to or greater than a second intensity 162. In the third dose range, a dose accumulated by the organic material may be greater than an upper threshold dose 173. For example, the second intensity 162 may be greater than the first intensity 161 by more than a factor of 1.2 (e.g., 2, 5, 10, 15, or by more than a factor of 15). For example, the intensity 131 of the light emission in the third dose range may be substantially maximum intensity. For example, a substantially maximum intensity may be an intensity greater than 95% of a maximum achievable intensity, e.g., greater than 96%, 97%, 98%, 99%, or greater than 99.9% of the maximum achievable intensity. For example, a substantially maximum intensity may increase or decrease only slightly (e.g., by less than 5%) when the accumulated dose is increased by more than 10% (e.g., more than 15%, 20%, or 25%).

In a second dose range 152, which may also be referred to as a threshold range, the intensity 131 of the light emission may increase from the first intensity 161 to the second intensity 162. The characteristic threshold dose 172 at which characteristic light emission may be triggered may be within the second dose range.

For example, the characteristic threshold dose 172 may be determined based on the second intensity, or a maximum intensity 131 of the light emission. For example, the characteristic threshold dose 172 may be a dose at which the intensity 131 of the light emission reaches a certain proportion of the second intensity, and/or a maximum intensity. For example, the characteristic threshold dose 172 may be determined based on an inflection point of the intensity 131 of the light emission. For example, the characteristic threshold dose 172 may be a dose at which the increase in intensity 131 of the light emission is maximum. For example, the characteristic threshold dose 172 may be determined based on a difference between the lower threshold dose 171 and the upper threshold dose 173. For example, the characteristic threshold dose 172 may be an average of the upper threshold dose 173 and lower threshold dose 171, such as an arithmetic average, a geometric average, a harmonic average, a median, or a weighted average. For example, the characteristic threshold dose 172 may be equal to the upper threshold dose 173 and/or lower threshold dose 171. For example, the second dose range 152 may comprise only the characteristic threshold dose 171.

Characteristic light emission may be the increase in intensity 131 of the light emission in the second dose range from the first intensity 161 to the second intensity 162. For example, the characteristic light emission may be a step increase from the first intensity 161 to the second intensity 162. For example, the characteristic light emission may be a larger increase in the intensity 131 of the light emission than the increase in the intensity 131 of the light emission in the first range or the third range, for example, by more than a factor of 2, 5, 10, or 20.

For example, the light emission in the third range may be referred to as phosphorescence. An organic material having a light emission characteristic as shown in FIG. 1A may be referred to as a phosphorescent organic material.

According to various aspects, a sensing device for measuring a dose of electromagnetic radiation may comprise a measurement strip. For example, only one sensor may be arranged on a measurement strip. If useful, a plurality of sensors could also be arranged on a measurement strip, for example for redundant measurement, or by means of appropriate coverage when irradiating the sensors, also for multiple successive measurements.

Figure 1B:
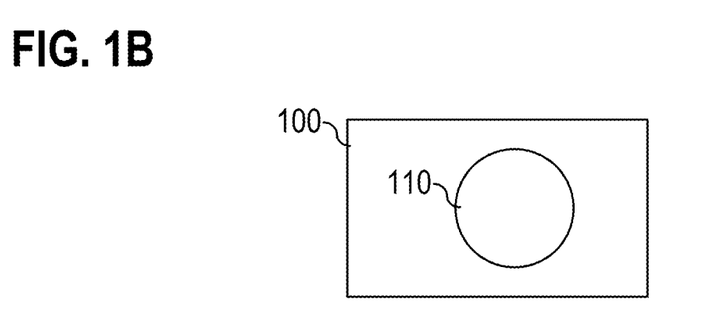
FIGS. 1B and 1C, each a schematic view of a sensing device.

FIG. 1B shows a sensing device 100 comprising a sensor 110. The sensor 110 may comprise an organic material capable of interacting with electromagnetic radiation.

According to various aspects, a sensing device 100 may comprise one or more sensors 110. For example, one or more sensors 110 may be disposed on a sensing strip.

Figure 1C:
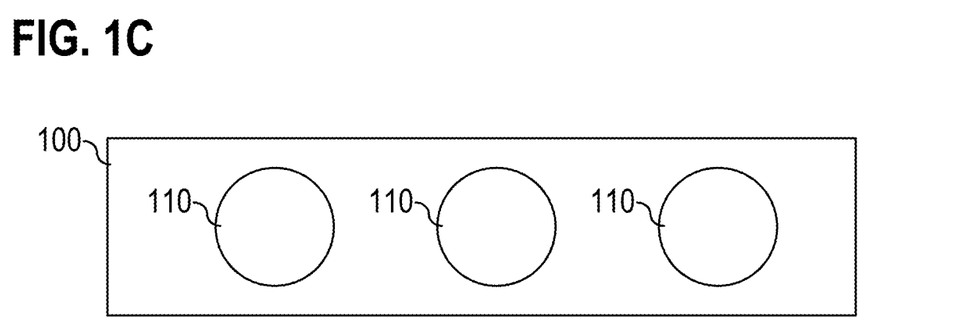

FIG. 1C illustrates a sensing device 100 having a plurality of sensors 110. For example, the plurality of sensors 110 may be arranged on a sensing strip. For example, the plurality of sensors 110 may comprise a first sensor 110 and a second sensor 110. The first sensor 110 and the second sensor 110 may comprise the same organic material. For example, the first sensor 110 and the second sensor 110 may be suitable for the same radiation ranges. For example, the first sensor and the second sensor may comprise the same detection spectrum. For example, the first sensor may be a measurement sensor and the second sensor may be a reference sensor for the measurement sensor. The first sensor 110 and the second sensor 110 may each comprise an organic material that is different from the other. For example, the first sensor and the second sensor may be suitable for different radiation ranges from each other. For example, the first sensor and the second sensor may each comprise a detection spectrum that is different from each other.

The sensor 110 may be covered by a reducing unit 120. For example, the sensor 110 may be adapted to a measurement environment by a reducing unit 120.

Figure 2A:
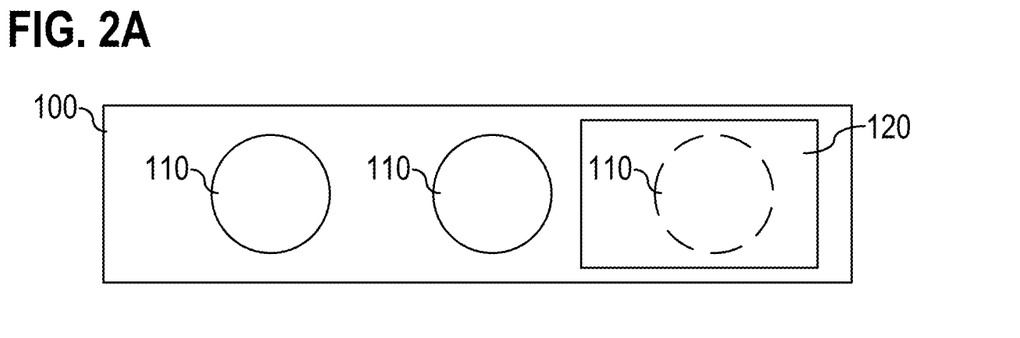
FIG. 2A-2C, each a schematic view of a sensing device comprising a reducing unit.

FIG. 2A shows a sensing device 100 comprising a plurality of sensors 110. The sensing device 100 may comprise a reducing unit 120. For example, a sensor 110 may be covered by the reducing unit 120. A covered sensor 110 is shown by a dash line in the figures.

The reducing unit 120 may be configured to entirely shield and/or reduce the intensity of radiation having one or more particular wavelengths of electromagnetic radiation incident on the sensor 110. The reducing unit 120 may be configured to filter the incident electromagnetic radiation. The reducing unit 120 may be configured to reduce the intensity of the incident electromagnetic radiation. For example, the reducing unit 120 may protect the sensor 110 from background radiation. For example, the reducing unit 120 may protect the sensor 110 from an intensity of incident radiation. For example, the reducing unit 120 may protect the sensor 110 from an intensity of the incident radiation (e.g., an intensity by means of which the characteristic threshold dose 172 may be exceeded). For example, the reducing unit 120 may provide a predetermined wavelength spectrum to the sensor 110.

Figure 2B:
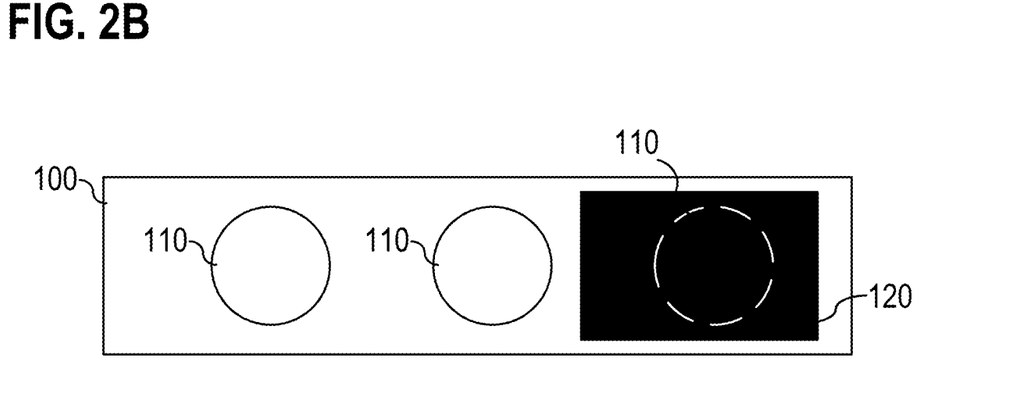

FIG. 2B illustrates a sensing device 100 having a reducing unit 120. For example, the reducing unit 120 may be configured to reduce the intensity of incident radiation on a sensor 110. For example, the reducing unit 120 may reduce the intensity of incident radiation by more than 10% (e.g., by more than 20%, 30%, 40%, 50%, 60%, 70%, 80%, 90%, 95%, or by more than 99%). For example, the reducing unit 120 may reduce the incident intensity by 100%. For example, the reducing unit 120 may be used in order to use the sensor 110 obscured by it as a reference sensor.

Figure 2C:
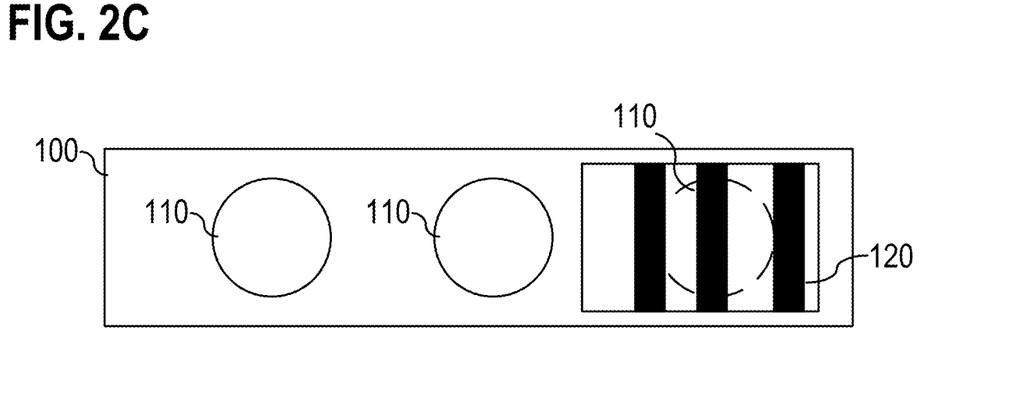

FIG. 2C shows a sensing device 100 having a reducing unit 120. The reducing unit 120 may be configured to reduce the intensity of incident radiation as a function of wavelength. Such a reducing unit 120 may be referred to as a wavelength filter.

For example, an incident radiation may comprise at least a first partial radiation having a first wavelength and a second partial radiation having a second wavelength, the second wavelength being unequal to the first wavelength. The reducing unit 120 may be configured to reduce the first partial radiation having the first wavelength (e.g., by more than 20%, 30%, 40%, 50%, 60%, 70%, 80%, 90%, 95%, or by more than 99% or by 100%). Thus, the sensor 110 may be at least partially or completely shielded from the first partial radiation by the reducing unit 120. For example, the reducing unit 120 may be further configured to not reduce the second partial radiation with the second wavelength or to reduce it with a different factor than the first partial radiation. For example, a wavelength sensitivity of the organic material may thus be compensated. For example, the sensor 110 may thus also be protected from interfering influences, such as ambient radiation, scattered radiation, during measurement or during a storage.

It is understood that the first wavelength and/or the second wavelength may be a plurality of first wavelengths and/or a plurality of second wavelengths. For example, the plurality of first wavelengths and/or plurality of second wavelengths may be a selection of wavelengths. It is understood that a plurality of sensors 110 of a sensing device 100 may be covered by a reducing unit 120. For example, a first sensor 110 may be covered with a first reducing unit 120 and a second sensor 110 may be covered with a second reducing unit 120. For example, the first reducing unit 120 and the second reducing unit 120 may be different from each other. For example, the first reducing unit 120 and the second reducing unit 120 may be the same.

The sensors 110 may be configured to determine a measured dose, wherein a threshold dose or characteristic threshold dose 172 is above the expected irradiation dose. The sensors 110 may comprise a phosphorescent organic material. Since the measured dose is below the characteristic threshold dose 172, there may not yet be any radiation in the organic material.

phosphorescence must be activated. As a result of the incident radiation, the sensing strip may be described as pre-activated. The sensors 110 may be configured to accumulate a dose that is below the characteristic threshold dose 172. Determining the accumulated dose, referred to as the measured dose, using a readout device may be referred to as readout. To determine the measurement dose, the sensors 110 of the sensing device 100 may be irradiated with an additional dose until the characteristic threshold dose 172 is reached. This additional dose will be referred to herein as the additional dose. The additional dose and the characteristic threshold dose 172 may be used to determine the measurement dose.

Figure 3A:
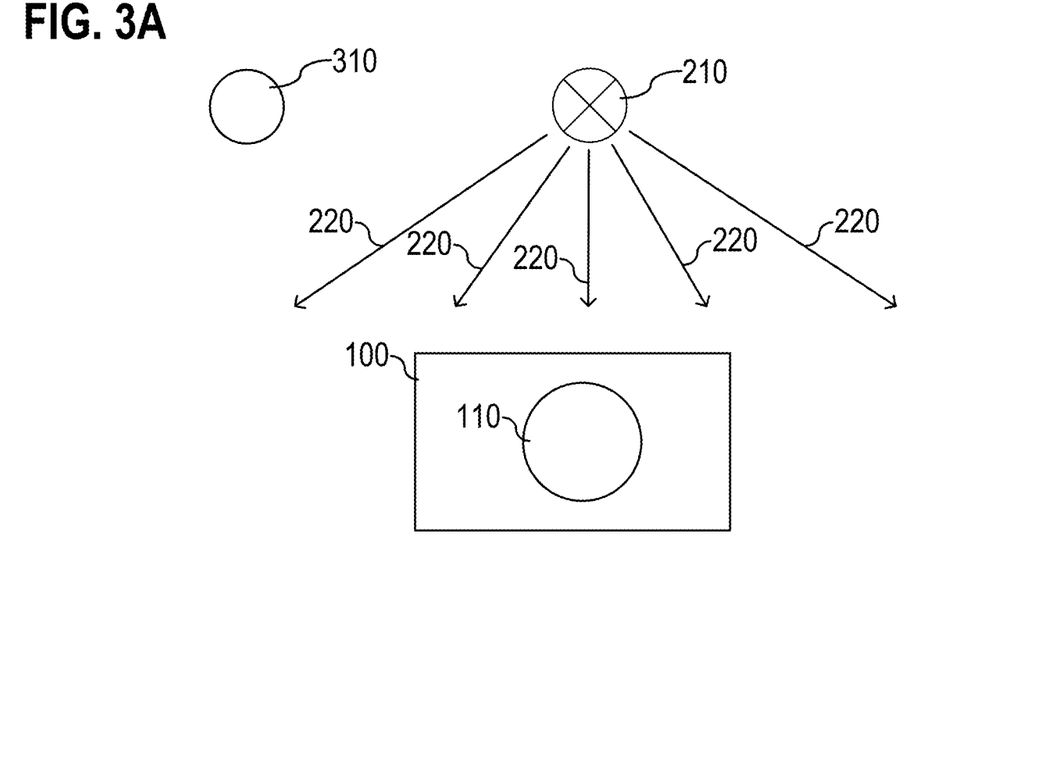
Figure 3B:
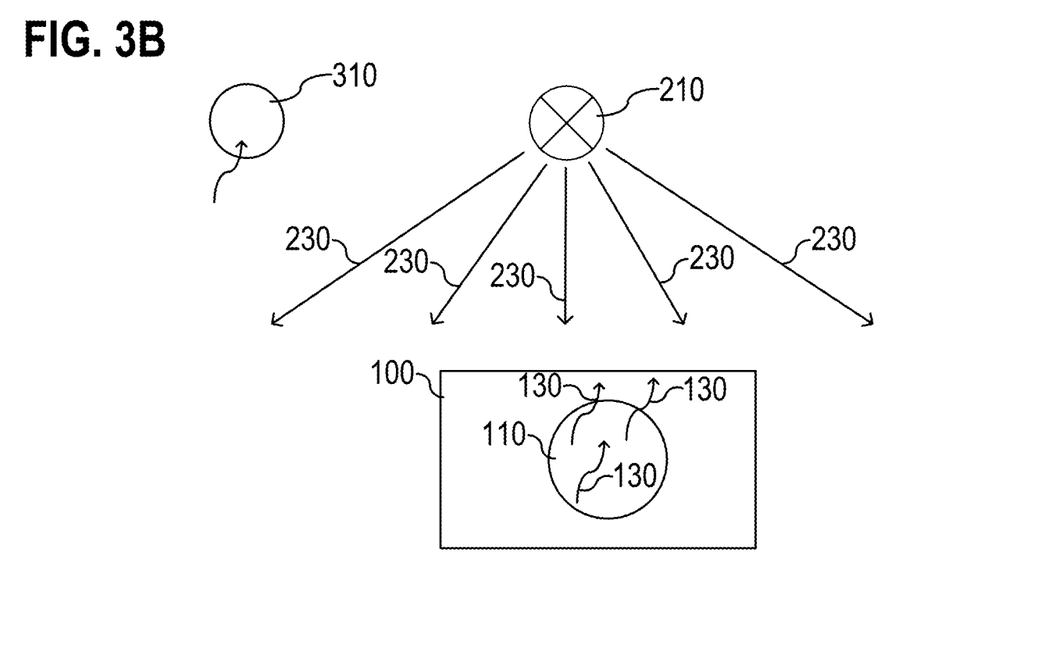

FIG. 3A shows a readout device for a sensing device 100 having a sensor 110, wherein the readout device comprises an auxiliary radiation source 210. The auxiliary radiation source 210 may be configured to irradiate the sensing device 100 with a radiation 220. The auxiliary radiation source 210 may be configured to irradiate the sensor 110 with a radiation 220. The radiation 220 emitted by the auxiliary radiation source 210 may comprise a known or predetermined wavelength spectrum. For example, the auxiliary radiation source 210 may be a light emitting diode (LED, e.g., a UV LED), a laser, or a gas discharge lamp (e.g., a mercury vapor lamp). The readout device may be configured to irradiate the sensor 110 from the supplemental radiation source 210 until a total dose (i.e., the dose accumulated on the sensor comprising the measured dose and the supplemental dose) reaches a characteristic threshold dose 172, and the organic material of the sensor 110 produces the characteristic light emission. The light emission from the organic material may be detected, for example, using a detector 310.

The additional dose may be output by the readout device. For example, the measured dose may be calculated as a difference between the characteristic threshold dose 172 and the additional dose. For example, the difference may be corrected by a correction factor or correction term. The correction factor or correction term may depend on a wavelength spectrum of the measurement environment and/or the supplemental radiation source. For example, the wavelength dependent sensitivity of the sensor 110 may be calculated against the wavelength spectrum of the measurement environment and/or the supplemental radiation source and included in the calculation of the correction factor. The correction factor or correction term may depend on an age of the sensor 110 and/or a number of measurements in which the sensor has already been used. For example, the correction factor or correction term may depend on a reducing unit 120 used. For example, the correction term may correct for a reduction in incident intensity by the reducing unit 120.

For example, the readout device may be configured so that the characteristic threshold dose 172 may be and may be input. The readout device may comprise a memory. For example, dosage limits may be stored and/or stored in the memory. The readout device may be configured to load a characteristic threshold dose 172 from the memory. For example, the characteristic threshold dose 172 may be automatically selected and loaded based on an identification device of a sensor 110. For example, the characteristic threshold dose 172 may be manually selected and loaded by a user. For example, the characteristic threshold dose 172 may be determined by determining the additional dose from a sensor 110 that is not pre-activated. The readout device may be configured to automatically determine the measured dose. For example, the measured dose may be determined based on an input or loaded characteristic threshold dose 172 and the additional dose. For example, the readout device may output the additional dose and/or the measured dose. It is understood that by output, it is meant both a visible output (e.g., on a display), and a storage on a storage medium.

The readout device may be configured to perform a serial readout of a plurality of sensing devices 100 and/or a plurality of sensors 110 in sequence. For each sensing device 100 and/or each sensor 110, for example, a respective characteristic threshold dose 172 may be loaded or input. For each sensing device 100 and/or sensor 110, a respective measured dose may be determined and output.

For example, the readout device may be configured to read out from a plurality of sensing devices 100. For example, a readout device may be configured to read out from one sensing device 100 comprising a plurality of sensors 110. For example, the plurality of sensors 110 of the one sensing device 100 may be read out simultaneously. For example, the plurality of sensors 110 of the one sensing device 100 may be used to perform reference measurements. It will be understood that, of course, different sensors 110 of different sensing devices 100 may be used to make reference measurements.

Figure 4A:
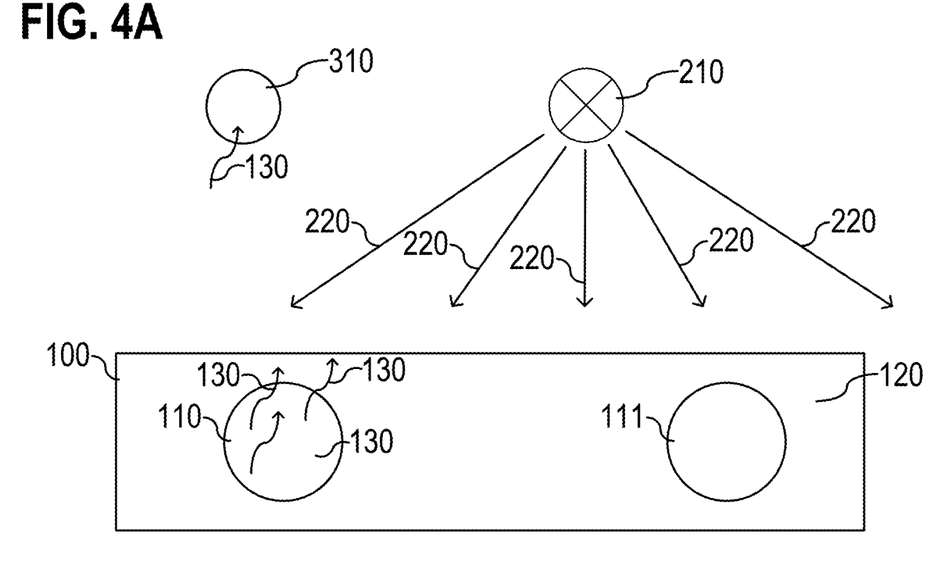
Figure 4B:
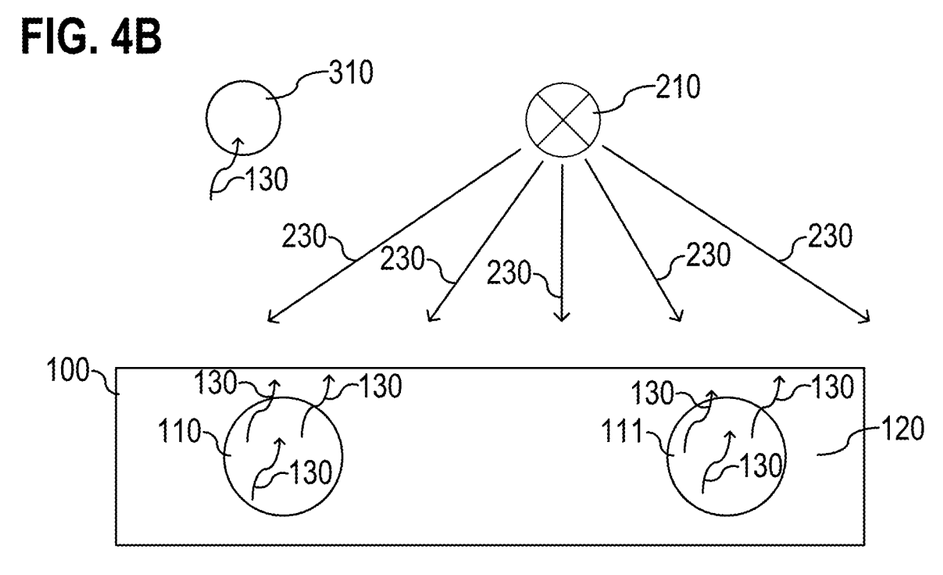

FIGS. 4A and 4B each show a step of a reference measurement. For example, a sensing device 100 with a first sensor 110 and a second sensor 111 may be used for the reference measurement. The first sensor 110 and second sensor 111 may be applied to the same measuring strip. This allows the sensors to be in similar condition (e.g., age, degradation, number of measurements, same storage or measurement environment, etc.), for example. The first sensor 110 and the second sensor 111 may comprise the same organic material. A first characteristic threshold dose 172 of the first sensor 110 and a second characteristic threshold dose 172 of the second sensor 111 may be the same. The sensing device 100 may comprise a reducing unit 120. The second sensor 111 may be covered by the reducing unit 120 during measurement of a to-be-determined radiation dose, i.e., the measurement dose. Thus, the intensity of radiation incident on the second sensor 111 may be reduced. A second measurement dose of the second sensor 111 may thereby be lower than a first measurement dose of the first sensor 110.

The reducing unit 120 may reduce the intensity of the radiation to be detected for the sensor 111 by a reduction factor. The reduction factor may be between 0 and 1 or 0% and 100%. For example, the reducing unit 120 may reduce the intensity of the radiation to be detected to zero, i.e., the reduction factor is 1 or 100%. The first measurement dose and the second measurement dose may differ from each other by the reduction factor.

FIG. 4A shows a first time point at which the first measurement dose and a first additional dose together reach the characteristic threshold dose 172 of the first sensor 110, and the organic material of the first sensor 110 may produce a first characteristic light emission. The first additional dose may be emitted. An emitted radiation 130 from the first sensor may be detected by a detector 310. For example, detection of the first characteristic light emission may trigger output of the first additional dose.

FIG. 4B shows a second time point at which the second measurement dose and a second additional dose together reach the characteristic threshold dose 172 of the second sensor 111, and the organic material of the second sensor 111 may produce a second characteristic light emission. The second additional dose may be emitted. An emitted radiation 130 from the second sensor may be detected by the detector 310. For example, detection of the second characteristic light emission may trigger output of the second additional dose.

The first measured dose may thus be determined from the second additional dose, the first additional dose and the reduction factor. In the following calculation example, the determination of the first measured dose is described by way of example using: the reduction factor n ($0<n<=1$), the first measured dose x1, the second measured dose x2, the first additional dose y1, the second additional dose y2, the first characteristic threshold dose z1 and the second characteristic threshold dose z2. The respective limiting doses result from the sum of the respective measured doses and the respective additional doses: $z1=x1+y1$ and $z2=x2+y2$. The second measuring dose x2 may differ from the first measuring dose by the reduction factor n: $x2=(1-n)*x1$. The first additional dose y1 may be smaller than the second additional dose y2 by a difference dose y': $y'=y2-y1$. The limiting doses z1, z2 of the first and second sensors may be equal: $z1=z2$. The first measurement dose x1 may then result from the differential dose y' and the reduction factor n: $x1=y'/n$.

For example, when $n=1$, the differential dose y' may correspond to the first measured dose. For example, the method described above may be used to determine a reduction factor n of a reducing unit, e.g., if the first measurement dose is known. For example, a wavelength-specific or wavelength-dependent reduction factor n may also be determined by irradiation with one or more predetermined wavelengths.

It is understood that a similar calculation to the example calculation shown may also be used to fit different emission spectra.

A sensing device 100 may be configured to be conditioned. A sensor 110 may be configured to be reprocessed. Conditioning may be understood to mean resetting the total accumulated dose on the sensor 110. Conditioning may be understood to mean placing the total accumulated dose at zero or at a predetermined known value. Reprocessing may allow a sensor 110, once used, to be reused. For example, a reprocessed sensor 110 may comprise a different known characteristic threshold dose 172 than a nonreprocessed sensor. For example, the characteristic threshold dose 172 may be related to a number of reprocessings performed.

The sensing device 110 may comprise an identification device. For example, the sensing device and/or the sensor 110 may be identified. The identification device may be an optical mark, e.g., a bar code, and/or a QR code, and/or a combination of characters, and/or a combination of colors, etc. The identification device may be an electronic mark stored on a storage medium, e.g., an RFID code, and/or a digital signature, and/or an NFC identifier, and/or other electronic identification. For example, the identification device may comprise a storage medium, e.g., a printing surface for an optical mark and/or an electronically readable storage medium. The identification device of a sensing device 100 may uniquely identify the identification device and/or the sensor 110. The identification device may represent the characteristic threshold dose 172 of the sensor 110. For example, the characteristic threshold dose 172 may be stored on the storage medium (e.g., printed or stored electronically). For example, the number of measurements and/or the date of manufacture of the sensor 110 may be stored on the storage medium. For example, information about the number of times the sensing device 100 and/or the sensor 110 have been processed may be stored on the storage medium.

The readout device may be configured to recognize the identification device. For example, the readout device may be configured to load and/or process information stored in the identification device. For example, a respective measured value may be stored on a memory of the identification device (e.g., electronically or printed).

A sensor may comprise a sensor surface. For example, a sensor surface may refer to an area in which the sensor comprises the organic material. For example, a large surface sensor may be a sensor having a sensor surface greater than 1 cm$^2$ (e.g., greater than 2 cm$^2$, 5 cm$^2$, 10 cm$^2$, or greater than 15 cm$^2$). For example, the readout device may be configured to read one or more sensors 110 (for example, one or more large area sensors 110) in a spatially resolved manner. For example, a sensor area may comprise a plurality of sub-areas (e.g., 2, 3, 4, 5, 6, 7, 8, 9, 10, or more than 10 sub-areas). For example, the readout device may be configured to read out a first subarea of the plurality of subareas of the sensor surface. For example, at least a second sub-area of the plurality of sub-areas may not be read out while the first sub-area is being read out. For example, the second subarea may be covered. For example, the second sub-area may be read out in a subsequent step. For example, a readout of a predetermined subarea of the sensor may be referred to as spatially resolved or a spatially resolved readout. For example, a photodiode array or a camera may be used as a detector 310 for readout.

Figure 5:
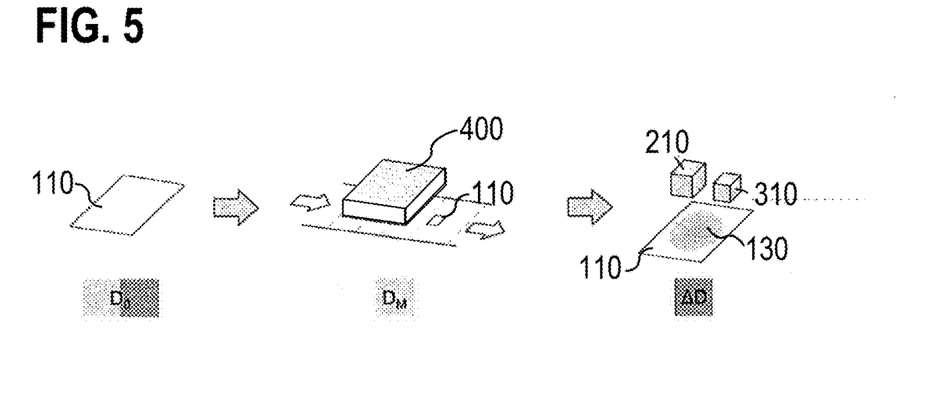
FIG. 5, an application example of a sensing device.

FIG. 5 illustrates a possible application example of the previously described sensing device 100. A sensor 110 may comprise a phosphorescent organic material. In a first step, the sensor 110 may be provided. The sensor 110 may comprise a first known accumulated dose, which may be referred to herein as zero dose $D_0$. The zero dose $D_0$ may be determined, for example, by another sensor 110 that is not irradiated but has been handled (attached, etc.) similarly to the sensor. The zero dose $D_0$ may be subtracted later. For example, the zero dose $D_0$ may have accumulated on the sensor 110 due to storage, environmental effects, a reprocessing process, and/or other reasons. In the following, the zero dose $D_0$ of the is considered equal to zero for the sake of clarity. It is understood that if the zero dose is greater than zero, the zero dose would have to be taken into account in each step, e.g., like a second known measured dose. For example, the measured dose may be determined from the threshold dose reduced by the additional dose and the zero dose $D_0$. Alternatively, the threshold dose may be normalized to the zero dose $D_0$. For example, the threshold dose normalized to the zero dose $D_0$ may be determined by reading an unirradiated sensor 110.

In a second step, the sensor 110 may be irradiated by a radiation source 400. For example, the radiation source 400 may be a lamp. For example, irradiation by the radiation source 400 may occur on an assembly line. For example, the radiation source 400 may be used to dry or cure paints, plastics, resins, ceramics, or other materials. For example, the radiation source may also be used to disinfect surfaces, liquids, packaging, or other items. For example, the radiation source may also be used in medical and/or cosmetic applications. For example, natural radiation sources such as the sun may also be used. The radiation source 400 may accumulate an irradiation dose, referred to as a measurement dose $D_M$ on the sensor. For example, the measurement strip may be selected such that a threshold value for triggering a characteristic light emission, i.e. a characteristic threshold dose 172 of the organic material, is above the expected irradiation dose $D_M$. As a result, phosphorescence is not yet activated after the actual radiation measurement, i.e., after the organic material of the sensor 110 has accumulated the dose $D_M$. However, due to the incident or accumulated radiation, the measuring strip may be said to be pre-activated.

In a third step, which may also be referred to as a readout step, the sensing device 100 may be placed in a readout apparatus (also referred to as a readout device) along with the sensor 110. The readout device may be configured to illuminate the sensor until the characteristic threshold dose 172 is reached. For example, the readout device may illuminate the sensing device and/or the sensor 110 with a known irradiance (e.g., in mW/cm$^2$) until phosphorescence appears. The appearance of the phosphorescence may be determined, for example, by detecting a characteristic light emission. For example, the time required for illumination may be used to calculate an additional dose $\Delta D$ (e.g., in mJ/cm$^2$) that was required to reach the characteristic threshold dose 172. For example, the additional dose $\Delta D$ may be a dose required to activate phosphorescence.

Figure 6:
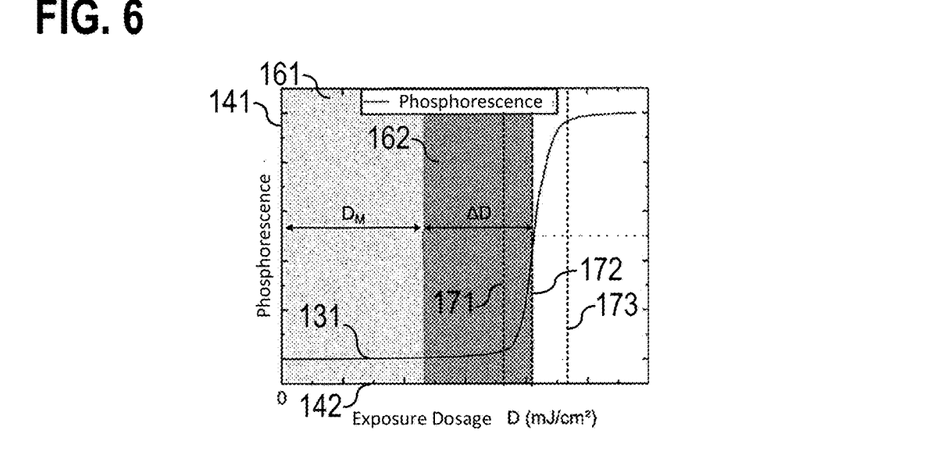
FIG. 6, a schematic diagram of the phosphorescence of a sensor.

FIG. 6 shows an exemplary light emission characteristic of the sensor 110 of FIG. 5. On the horizontal axis 142 is shown an exposure dose (e.g., in mJ/cm$^2$), i.e., a dose accumulated by the sensor 110. On the vertical axis 141 is shown a phosphorescence, i.e., an intensity of emission of radiation from the organic material of the sensor 110. In a measurement dose range 161, the first step may be depicted in FIG. 5: irradiation with the measurement dose D M by the radiation source 400. In an additional dose range 162, irradiation with the additional dose $\Delta D$ may be depicted by the readout device. Within the additional dose range 162, the dose accumulated on the sensor may reach a lower threshold dose 171. When the accumulated dose from the sensor 110 reaches the lower threshold dose 171, the intensity 131 of the light emission may increase. If the accumulated dose is further increased, a characteristic light emission may be observed at the characteristic threshold dose 172. For example, the organic material of the sensor 110 may begin to phosphoresce when it has accumulated a dose equal to the characteristic threshold dose 172. When the organic material of the sensor 110 has accumulated an upper threshold dose 173, the intensity of the light emission may be substantially maximum.

For example, the dose $D_M$ irradiated in the first measuring step may be calculated via the known dose threshold 172 (also referred to as irradiation threshold), which is necessary to activate the phosphorescence of an unused sensor. Here, the possible measurement range may be limited upwards by the irradiation threshold of the sensor. Based on the irradiation dose, further parameters may be calculated, for example, such as a radiant intensity, an irradiance, a specific radiation and/or a radiation energy.

Figure 7:
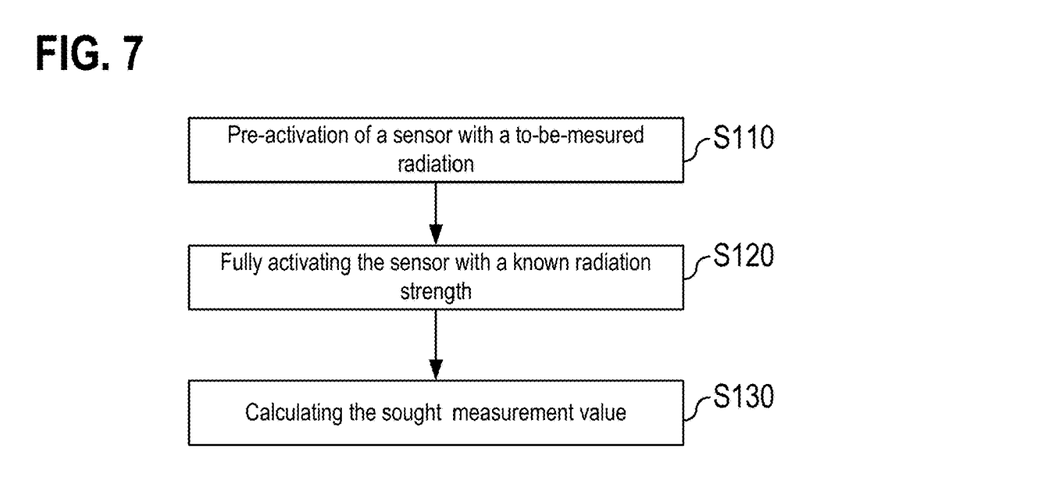
FIG. 7, a schematic method for determining a radiation dose.

FIG. 7 describes a method for determining a measured value of a radiation to be examined. In the first step, a sensor may be pre-activated with a radiation to be examined (e.g., to be measured) (S110). For example, a to-be-determined dose may be applied to a sensor. For example, phosphorescence of an organic material of a sensor may be pre-activated. In the second step, the sensor may be irradiated with a known irradiance until a characteristic threshold dose is reached and/or the sensor is fully activated (S120). For example, the sensor may be irradiated until the phosphorescence of the organic material of the sensor is fully activated. For example, the sensor may be irradiated in a readout device. In the third step, the measured value of the radiation under investigation may be calculated (S130). For example, the measured value may be calculated using a difference. For example, the difference may be calculated from the dose used in the second step and the characteristic threshold dose. For example, the characteristic threshold dose may be a dose necessary to activate a phosphorescence in a fresh measurement strip.

The following are some examples that relate to what is described herein and shown in the figures.

Example 1 is a sensor for determining a radiation dose, the sensor may comprise: an organic material, the organic material being capable of having a light emission characteristic that is radiation dose dependent such that a characteristic light emission may be generated from the organic material once the organic material has accumulated a radiation dose that is greater than a threshold radiation dose characteristic, the sensor being further configured such that a difference of the threshold radiation dose characteristic and a radiation dose accumulated in the material may represent a radiation dose to be determined. For example, the radiation dose accumulated in the material may be a measured dose or a to-be-determined dose. The dose accumulated in the material may also be referred to as a dose stored by the sensor. For example, the sensor may be located on a measurement strip.

Example 2 is a sensor according to example 1, wherein the organic material may be configured such that the organic material may emit radiation in an intensity range less than a first intensity when the organic material has accumulated a radiation dose that is less than the characteristic threshold radiation dose, and such that the organic material may emit radiation in an intensity range greater than a second intensity when the organic material has accumulated a radiation dose that is greater than the characteristic threshold radiation dose. For example, the second intensity may be greater than the first intensity. The intensity of the emitted radiation may refer to an intensity of radiation having one or more wavelengths. For example, for radiation having a plurality of wavelengths, the intensity of the radiation may be a sum or average of intensities of one or more selected portions of radiation each having a selected wavelength or range of wavelengths. For example, the intensity may be based on all radiation components.

Example 3 is a sensor according to example 2, wherein the characteristic threshold radiation dose may be within a threshold dose range, wherein the threshold dose range may comprise a lower threshold dose and an upper threshold dose, and wherein the intensity, of radiation emitted from the organic material, may increase from a first intensity at a lower threshold dose to a second intensity at an upper threshold dose. The upper threshold dose may be greater than the lower threshold dose. The increase in intensity may be dependent on the total radiation dose accumulated in the organic material of the sensor.

Example 4 is a sensor according to any of examples 1 to 3, wherein the characteristic light emission may be a multiplication of the emission, for example the intensity of the emitted radiation. For example, the emission may increase by more than a factor of 1.2 (e.g., by more than a factor of 2, 3, 4, 5, 6, 7, 8, 9, 10, 15, or by more than a factor of 15). For example, the characteristic light emission may be an increase (e.g., as a step increase) in a light emission characteristic of the organic material.

Example 5 is a sensor according to any of examples 1 to 4, wherein the accumulated radiation dose may be accumulated from any of the following ranges: UV radiation range, and/or visible light radiation range, and/or IR radiation range. For example, the accumulated radiation dose may be accumulated from one or more sub-ranges of said ranges. For example, the accumulated radiation dose may be accumulated by one or more wavelengths from said ranges.

Example 6 is a sensing device comprising a first sensor according to any of examples 1 to 5. For example, the sensing device may comprise a second sensor according to any of examples 1 to 5. For example, the first sensor and the second sensor may be configured according to a different example from each other. For example, the first sensor and the second sensor may be configured according to the same example. For example, the first sensor may comprise a first characteristic threshold dose and the second sensor may comprise a second characteristic threshold dose. For example, the first characteristic threshold dose may differ from the second characteristic threshold dose by more than 10%, such as by more than 20%, 50%, 100%, or by more than 200%). For example, the first characteristic threshold dose may not differ from the second characteristic threshold dose, i.e., differ by less than 10%, e.g., by less than 5%, 1%, 0.01%, or by less than 0.01%). For example, the first sensor may be located in a first measurement range and the second sensor may be located in a second measurement range. For example, the first sensor may be independent of the second sensor. For example, the first sensor may be functionally coupled to the second sensor, e.g., they may then only be irradiated simultaneously for redundant measurement or to perform a differential measurement. For example, the sensing device may comprise more than the two sensors. For example, the sensing device may comprise 3, 4, 5, 6, 7, 8, 9, 10, 15, 25, 100, or more than 100 sensors, wherein each of the sensors may be configured according to any of examples 1 to 5 (e.g., independently of the other sensors).

In some aspects, a plurality of identical sensors may be integrated into the sensing device (illustratively on a sensing strip). These may then comprise the same irradiation behavior (or measurement behavior) and emission behavior (or readout behavior), etc.

Example 7 is a sensing device comprising according to example 6, wherein the sensing device may optionally further comprise a reducing unit. The reducing unit may be configured to reduce an intensity of radiation incident on the organic material. For example, the reducing unit may reduce the incident intensity by more than 10% (e.g., by more than 10%, 20%, 30%, 40%, 50%, 60%, 70%, 80%, 90%, 95%, or by more than 99%). For example, the reducing unit may reduce the incident intensity by 100%. For example, the reducing unit may reduce the intensity of a first predetermined selection of one or more wavelengths by more than the intensity of a second selection of one or more wavelengths. For example, the second sensor may be covered by the reducing unit. For example, the second sensor may thereby accumulate a reduced radiation dose.

Example 8 is a sensing device according to example 6 or 7, wherein the sensing device may optionally further comprise an identification device. For example, the identification device may comprise an identifier in the form of an RFID code, NFC code, bar code, printed string, color code, or the like.

Example 9 is a sensing device according to any of examples 6 to 8, wherein the sensing device may comprise a memory. For example, the memory may store an identifier of the sensing device, the first sensor, and/or the second sensor. For example, a characteristic threshold dose may be stored in the memory. For example, an age of the sensing device and/or the first sensor and/or the second sensor may be stored in the memory. For example, the identification device may comprise the memory or an additional memory.

Example 10 is a readout device for reading out a sensing device according to any of examples 6 to 9, wherein the organic material of a first sensor of the sensing device may comprise an accumulated dose, a so-called measurement dose. The readout device may comprise: an auxiliary radiation source for irradiating the sensor with an auxiliary dose, wherein the auxiliary dose may represent the measurement dose introduced in the organic material, and an output device for outputting the auxiliary dose.

Example 11 is a readout device according to example 10, wherein the characteristic light emission of the organic material of the first and/or the second sensor may be triggered by the additional dose. For example, the characteristic light emission of the organic material of the first and/or the second sensor may be triggered when a total dose from the measured dose and the additional dose reach the characteristic threshold dose.

Example 12 is a readout device according to example 10 or 11, wherein the auxiliary radiation source may emit radiation with a predetermined wavelength spectrum and/or with a predetermined intensity.

Example 13 is a readout device according to any of examples 10 to 12, optionally further comprising a radiation detector for detecting light emissions from the first and/or the second sensor. For example, the radiation detector may be configured to detect the characteristic light emission. For example, the readout device may be configured to stop reading the sensing device once the radiation detector detects the characteristic light emission.

Example 14 is a readout device according to any of examples 10 to 13, optionally further configured to determine the measured dose of the first and/or the second sensor and/or the dose accumulated on the first and/or the second sensor. For example, the readout device may optionally further comprising an input unit for inputting a theoretical and/or measured characteristic threshold radiation dose. For example, the input unit may be a manual input unit, such as a keypad, a pressure sensitive display, a dial, or something similarly suitable for inputting a value. For example, the input unit may be an automated input unit that may automatically detect and input the theoretical and/or measured characteristic threshold radiation dose based on the sensing device, and/or the first sensor, and/or the second sensor. For example, the theoretical and/or measured characteristic threshold radiation dose may be detected and/or input and/or loaded based on an identification device of the sensing device.

Example 15 is a readout device according to any of examples 10 to 14, wherein the readout device may further comprise a data management unit. The data management unit may be configured to store data and load data. For example, the data may comprise one or more of: one or more theoretical and/or measured characteristic marginal radiation doses, and/or one or more identifiers of the sensor, and/or one or more correction quantities (predetermined spectra, reduction factors, etc.), and/or one or more predetermined additional doses. For example, a specific additional dose may be associated with a specific measurement procedure (e.g., a quality check). For example, a correction quantity may be a quantity for correcting a wavelength dependence of the sensitivity of the first and/or second sensor. For example, there may be a first wavelength range in which the first and/or second sensor captures (e.g., stores) more dose than in a second wavelength range. The wavelength dependence may relate to the wavelength spectrum of the radiation source being measured and/or the wavelength spectrum of the supplemental radiation source. For example, a correction quantity may be a quantity for correcting an intensity of the supplemental radiation source. For example, an intensity of the supplemental radiation source may increase or decrease with time. For example, a correction quantity may be a quantity for correcting an age of the sensing device, and/or the first sensor, and/or the second sensor. For example, the sensitivity of the first sensor and/or the second sensor may decrease or increase over time. For example, for a sensor, the theoretical and/or measured characteristic threshold radiation dose may decrease and/or increase with time.

Example 16 is a readout device according to any of examples 10 to 15, wherein the readout device may optionally be further configured to determine the radiation dose accumulated on the first and/or the second sensor or the measured dose from the additional dose and the theoretical and/or measured characteristic threshold radiation dose.

Example 17 is a readout device according to any of examples 10 to 15, wherein the readout device may optionally be further configured to determine the measured dose of the first and/or the second sensor from the additional dose, the theoretical and/or measured characteristic threshold radiation dose, and one or more correction quantities.

Example 18 is a readout device according to any of examples 10 to 17, wherein the readout device may be configured to: read out a first measurement dose of the first sensor and a second measurement dose of the second sensor. For example, the readout device may be further configured to output a first additional dose associated with the first measurement dose and a second additional dose associated with the second measurement dose. For example, the first additional dose and the second additional dose may represent the respective accumulated radiation dose. For example, the first and second sensors may be read out in parallel or at least partially in parallel (e.g., in different chambers). For example, the first and second sensors may be read out serially (i.e., one after the other) (e.g., by covering all but one sensor to be read out).

Example 19 is a readout device according to any of examples 14 to 17, wherein the readout device may optionally be further configured to determine the first measurement dose of the first sensor from the first additional dose of the first sensor and the second additional dose of the second sensor.

Example 20 is a readout device according to example 19, wherein the readout device may optionally be further configured to determine the first measured dose from the first additional dose, the second additional dose, and one or more correction quantities.

Example 21 is a readout device according to any of examples 14 to 19, optionally further comprising a determination unit that may be configured to perform the respective determination and/or calculations. For example, the determination unit may comprise a processor. For example, the determination unit may be an electronic computing device.

Example 22 is a method for determining a radiation dose or measurement dose accumulated in an organic material of a sensor according to any of examples 1 to 5. The method may comprise: Applying an additional dose until the organic material of the sensor produces the characteristic light emission, and outputting the additional dose, which may represent the measurement dose of the organic material of the sensor.

Example 23 is a method according to example 21, optionally further comprising determining the measured dose of the sensor from a theoretical and/or measured characteristic threshold radiation dose and the additional dose.

Example 24 is a method according to example 22, optionally further comprising determining the measured dose of the sensor from a theoretical and/or measured characteristic threshold radiation dose, the additional dose, and one or more correction quantities.

Example 25 is a method for determining a radiation dose using a sensing device according to any of examples 6 to 9. For example, a first measured dose may be accumulated in the first sensor and a second measured dose may be accumulated in the second sensor. The method may comprise: Masking the second sensor during measurement such that an intensity of radiation incident on the second sensor (i.e., a radiation to be measured) is reduced by more than 10%, for example, by more than 20%, 30%, 40%, 50%, 60%, 70%, 80%, 90%, 95%, or by more than 99%. For example, the intensity may be reduced by 100%. Illustratively, the second sensor may accumulate only a smaller dose than the first sensor during the measurement. The method may further comprise: Applying the to-be-determined dose to the sensing device (i.e., to the first sensor and the second sensor that is covered), applying a first additional dose to the first sensor until the organic material of the first sensor produces the characteristic light emission of the first sensor, applying a second additional dose to the second sensor until the organic material of the second sensor produces the characteristic light emission of the second sensor, and determining the radiation dose accumulated on the first sensor using the second additional dose and the first additional dose. For example, before applying the second additional dose, the cover of the second sensor may be removed.

Example 26 is a method for determining an irradiation, in which a phosphorescent sensor may be used on a measuring strip. The threshold value of the sensor may be above a value of the expected irradiation. This may result in no phosphorescence being activated after the actual radiation measurement. However, the measurement strip may be pre-activated by the incident radiation. In the subsequent readout step, the measuring strip may be brought into a readout device which re-illuminates it with a known irradiance (e.g., in $mW/cm^2$) until a phosphorescence appears. The time required for this may be used to calculate the irradiance (e.g., a dose in $mJ/cm^2$) that was still required for activation. Via the known irradiation threshold, which is necessary to activate the phosphorescence of a fresh measuring strip, the irradiation irradiated in the first measuring step (e.g. the dose) may be calculated. Here, the possible measuring range may be limited upwards by the threshold value of the sensor on the measuring strip. Based on the irradiation, a radiation intensity, an irradiance, a specific radiation and a radiation energy may be calculated via further, adjustable parameters.

Example 27 is a method for determining a measured value of a radiation, the method may comprise, for example: Preactivating a phosphorescence of a sensor on a measurement strip with the radiation to be measured. Fully activating the phosphorescence in a readout device with a known irradiance. Calculating the sought measurement value via a difference of the irradiation used in the second step and the irradiation necessary to activate the phosphorescence in a fresh measuring strip.

Example 28 is a readout device for reading out a sensor, wherein the sensor comprises: an organic material, the organic material comprising a radiation dose-dependent light emission characteristic such that a characteristic light emission is produced by the organic material once the organic material has accumulated a total radiation dose greater than a threshold radiation dose characteristic, wherein the organic material of the sensor has an accumulated measurement dose, and wherein the sensor is configured such that a difference of the characteristic threshold radiation dose and the accumulated measurement dose represents the accumulated measurement dose, comprising the readout device: an auxiliary radiation source for irradiating the sensor with an auxiliary dose, wherein the auxiliary dose triggers the characteristic light emission of the organic material of the sensor when a total dose of the accumulated measurement dose and the auxiliary dose reach the characteristic threshold radiation dose; and wherein the additional dose represents a dose from the measurement dose accumulated on the sensor to reaching the characteristic threshold radiation dose; and output means for outputting a value representing the additional dose.

Example 29 is a readout device according to example 28, wherein the auxiliary radiation source emits radiation having a predetermined wavelength spectrum and/or a predetermined intensity.

Example 30 is a readout device according to example 28 or 29, optionally further comprising a radiation detector for detecting light emissions from the sensor.

Example 31 is a readout device according to any of examples 28 to 30, further optionally comprising a determination device for determining the accumulated measured dose.

It is understood that the features of the readout device according to any one of examples 10 to 21 may be transferred in an analogous manner to the readout device according to any one of examples 28 to 31.

Example 32 is a method for determining a measurement dose accumulated in an organic material of a sensor, the sensor comprising: an organic material, the organic material having a light emission characteristic that is radiation dose dependent such that a characteristic light emission is produced from the organic material once the organic material has accumulated a total radiation dose that is greater than a threshold radiation dose characteristic, the sensor being configured such that a difference of the threshold radiation dose characteristic and the accumulated measurement dose represents the accumulated measurement dose, the method comprising: applying an additional dose until the organic material of the sensor produces the characteristic light emission, and outputting a value representing the additional dose representing the accumulated measurement dose of the sensor.

Example 33 is a method according to example 32, further optionally comprising: determining the accumulated measured dose of the sensor from the characteristic threshold radiation dose and the additional dose.

Example 34 is a method according to example 33, further comprising, determining the accumulated measured dose from a characteristic threshold radiation dose, the additional dose, and one or more correction quantities.

Example 35 is a method according to any one of examples 32 to 34, wherein the organic material of the sensor is configured such that the organic material emits radiation at an intensity in an intensity range less than a first intensity when the organic material has accumulated a radiation dose that is less than the characteristic threshold radiation dose, and that the organic material emits radiation in an intensity range greater than a second intensity when the organic material has accumulated a radiation dose that is greater than the characteristic threshold radiation dose, and wherein the first intensity is less than the second intensity.

Example 36 is a method according to example 35, wherein the characteristic threshold radiation dose is within a threshold dose range, wherein the threshold dose range comprises a lower threshold dose and an upper threshold dose, and wherein an intensity, of radiation emitted from the organic material, increases from a first intensity at a lower threshold dose to a second intensity at an upper threshold dose, wherein the upper threshold dose is greater than the lower threshold dose, and wherein the increase in intensity is dependent on the total accumulated radiation dose of the sensor.

Example 37 is a method according to any of examples 32 to 36, wherein the characteristic light emission is a multiplication of an intensity of the emitted radiation by more than a factor of 1.2.

Example 38 is a method according to any of examples 32 to 37, wherein the accumulated measurement dose may be formed using any of the following radiations: X-radiation, and/or gamma radiation, and/or EUV radiation, and/or UV radiation, and/or visible light, and/or IR radiation.

It is understood that the features described with respect to examples 22 to 27 may be applied in an analogous manner to the methods of examples 32 to 38.

Example 39 is using a sensor to determine a measurement dose accumulated on the sensor that is less than a threshold radiation characteristic, wherein the sensor comprises an organic material, and wherein the organic material has a radiation dose-dependent light emission characteristic such that a characteristic light emission is produced from the organic material once the organic material has accumulated a total radiation dose that is greater than the threshold radiation characteristic.

The invention claimed is:

1. Sensor for determining a radiation dose, the sensor comprising:
    an organic material, the organic material comprising a radiation dose-dependent light emission characteristic such that a characteristic light emission is produced by the organic material once the organic material has accumulated a radiation dose greater than a characteristic threshold radiation dose,
    wherein the sensor is further configured such that a difference of the characteristic threshold radiation dose and a radiation dose accumulated in the material represents a to-be-determined radiation dose.

2. Sensor according to claim 1,
    wherein the organic material is configured such that the organic material emits radiation having an intensity in an intensity range less than a first intensity when the organic material has accumulated a radiation dose less than the characteristic threshold radiation dose,
    wherein the organic material emits radiation in an intensity range greater than a second intensity when the organic material has accumulated a radiation dose greater than the characteristic threshold radiation dose, and
    wherein the first intensity is less than the second intensity.

3. Sensor according to claim 2,
    wherein the characteristic threshold radiation dose is within a threshold dose range,
    wherein the threshold dose range comprises a lower threshold dose and an upper threshold dose, and
    wherein an intensity, of the radiation emitted from the organic material, increases from a first intensity at a lower threshold dose to a second intensity at an upper threshold dose,
    wherein the upper threshold dose is greater than the lower threshold dose, and
    wherein the increase in intensity depends on the total accumulated radiation dose of the sensor.

4. Sensor according to claim 1,
    wherein the characteristic light emission is a multiplication of an intensity of the emitted radiation by more than a factor of 1.2.

5. Sensor according to claim 1,
    wherein the accumulated radiation dose may be formed by means of any of the following radiations: X-radiation, and/or gamma radiation, and/or EUV radiation, and/or UV radiation, and/or visible light, and/or IR radiation.

6. Sensing device for determining a radiation dose comprising,
    a first sensor according to claim 1,
    a second sensor according to claim 1.

7. Sensing device according to claim 6 further comprising,
    a reducing unit, for reducing an intensity of radiation incident on the organic material of the first and/or second sensor by more than 10%,
    wherein the reducing unit may reduce the intensity, in particular, by more than 50%,
    where the reducing unit may reduce the intensity by 100% in particular.

8. Readout device for reading out a sensor according to claim 1, wherein the organic material of the sensor comprises a measuring dose, comprising the readout device:
    an auxiliary radiation source for irradiating the sensor with an auxiliary dose,
    wherein the additional dose represents the radiation dose accumulated on the sensor,
    a dispensing device for dispensing the additional dose.

9. Readout device according to claim 8,
    wherein the characteristic light emission of the organic material of the sensor is triggered by the additional dose when a total dose from the measured dose and the additional dose reach the characteristic threshold dose.

10. Readout device according to claim 8,
    wherein the auxiliary radiation source emits radiation having a predetermined wavelength spectrum and/or having a predetermined intensity.

11. Readout device according to claim 8,
    further comprising a radiation detector for detecting light emissions from the sensor.

12. Readout device according to claim 8,
further comprising a determining device for determining the measured dose.

13. Method for determining a radiation dose accumulated in an organic material of a sensor according to claim 1 as a measurement dose, the method comprising:
applying an additional dose until the organic material of the sensor produces the characteristic light emission, and
output the additional dose representing the accumulated radiation dose of the sensor.

14. Method according to claim 13, further comprising,
determine the accumulated radiation dose of the sensor from a characteristic threshold radiation dose and the additional dose.

15. Method according to claim 14, further comprising,
determine the measured dose from a characteristic threshold radiation dose, the additional dose, and one or more correction quantities.

* * * * *